United States Patent [19]

Spirig

[11] 4,416,408
[45] Nov. 22, 1983

[54] SOLDER REMOVING DEVICE

[76] Inventor: Ernst Spirig, P.O. Box 160, CH-8640 Rapperswil, Switzerland

[21] Appl. No.: 266,324

[22] Filed: May 22, 1981

[51] Int. Cl.³ .............................................. B23K 1/00
[52] U.S. Cl. ...................................... 228/19; 228/264
[58] Field of Search .................. 228/19, 264; 428/608, 428/389, 594

[56] References Cited

U.S. PATENT DOCUMENTS 3,715,797 2/1973 Jackson et al. ..................... 228/19 X
3,726,464 4/1973 Howell et al. ......................... 228/19

FOREIGN PATENT DOCUMENTS 7003315 9/1970 Netherlands ........................ 428/389

Primary Examiner—Nicholas P. Godici
Assistant Examiner—M. Jordan
Attorney, Agent, or Firm—Laubscher, Philpitt & Laubscher

[57] ABSTRACT

A solder removing device is disclosed for absorbing solder which has been rendered molten by the application of heat, including an open-mesh structure comprising a strand and formed by knitting, as a primary example, at least the surface of the strand being metallic and receptive to solder flux (and indeed being coated with solder flux rendering it more capable of wetting with molten solder). The open-mesh structure enables the device to absorb solder more freely and in greater quantities than can prior braided devices in which the multiple strands are contiguous.

7 Claims, 2 Drawing Figures

SOLDER REMOVING DEVICE

BRIEF DESCRIPTION OF THE PRIOR ART

This invention relates to a solder removing device for use in absorbing, by capillary attraction, solder which has been made molten by heating when it is desired to break a soldered connection, for example, in an electronic circuit.

Solder removing wicks in elongate form are known in the art shown for example, by U.S. Pat. No. 3,627,191 and my U.S. Pat. Nos. 4,081,575 and 4,164,606. Such wicks comprise fine copper wires (possibly alloy-coated) braided together into an elongate tubular structure (subsequently flattened) and coated with a solder flux (for example rosin) to improve the capability of the wires to be wetted by the molten solder. In use, an end of the braided wick is applied to the solder which has been made molten, and this solder is absorbed by capillary attraction into the interstices between the wires.

The interstices between adjacent wire strands are in fact found to be relatively small: the main interstice is the volume within the tubular (but flattened) structure, but the molten solder can usually only reach this volume by passing between the adjacent strands of the braid and the flow of solder is therefore slow. Indeed, it is a practice, when carrying out a solder-removing operation, to destroy the integrity of the braid at the end of the wick by "mopping" it with the soldering iron tip over a projecting wire end at the solder-removing site, so as to fan out the wires at the end of the wick and thus create enlarged interstices.

SUMMARY OF THE INVENTION

In accordance with the present invention, there is provided a solder removing device comprising an open-mesh structure including at least one strand and formed by weaving, stranding, braiding, knitting or crochetting, at least the surface of the strand being metallic and receptive to solder flux and indeed being coated with solder flux rendering it more capable of wetting with molten solder. Also in accordance with this invention, there is provided a method of solder removing using a device which comprises an open-mesh structure comprising at least one strand and formed by weaving, stranding, braiding, knitting or crochetting.

Relatively large-size interstices for solder-absorbing are available because adjacent sections of the strand or strands are not touching or contiguous.

A preferred structure comprises an elongate, flattened tubular structure formed by knitting. Thus, at least one single strand is formed into an elongate tubular structure by a continuously operating knitting machine, the structure being subsequently flattened (either between rollers or simply being wound onto a reel).

The open-mesh structure exhibits the advantage of relatively large-size interstices to receive the molten solder. More solder is absorbed by the same quantity of copper wire, with consequent improved efficiency and economy. The knitting process enables at least an equivalent length of wick to be manufactured in a given time period and enables a much higher width of wick to be formed. The wick may also be formed as a pad instead of as an elongate structure, in which case it may be applied face-to-face with a circuit board to remove molten solder from an entire area of the circuit board.

The open-mesh structure exhibits further advantages also. Copper wires stranded together must normally be cleaned of oxide layers or other contaminants which would interfere with the receiving of solder flux or with the wetting by molten solder. Cleaning may be effected by applying heat whilst the wick is in a vacuum or in a reducing gas or an inert gas. However, the prior braided structures, with adjacent strands contiguous, do not readily permit the passage of gas from or to the interior of the tubular structure, so that its inner surface will not be so clean as the outer surface, yet the inner surface is important as a wetting surface. Chemical cleaning may alternatively be used, but again the contiguous strands in the prior braided structures inhibit the passage of cleaning fluid to and from the braid interior: cleaning chemical trapped on the interior of the braid would require considerable rinsing to remove it otherwise it would prove a serious contaminant. By contrast, the open-structure in accordance with this invention readily facilitates cleaning either by applying heat (for example passing an electrical current through the wick until it glows) in a vacuum or in an inert or reducing gas, or by using a chemical cleaner with subsequent rinsing. Less energy is required for whatever heating method is used, because of the lower weight of copper.

Also, prior braided wicks are normally coated with flux by dipping into a solution containing rosin with subsequent evaporation and drying. The solution must penetrate to the inner surface of the wick, but with the prior braided wick the penetration is slow and may not be complete. The open-mesh structure provides ready access for the solution to all surfaces of the strands, and for the subsequent drying by application of hot air or by subjecting the wick to a vacuum.

Moreover, the possibility also arises of coating the strands with copper (or alloy as in my U.S. Pat. No. 4,164,606) once the open-mesh structure has been formed, thus providing a clean copper coating on all surfaces of the strands. For example, the structure may be formed of copper wires which are then coated with copper by chemical deposition, or the structure may be formed of low-cost metal wires (or indeed of non-metallic filaments) which are then coated with copper, with subsequent application of flux.

It will also be appreciated that the open-mesh structures in accordance with this invention will require a solder iron of lesser wattage to heat up than the prior braided wick, because of its lesser copper content per unit length.

BRIEF DESCRIPTION OF THE DRAWING

An embodiment of this invention will now be described, by way of example only, with reference to the accompanying drawing, in which.

DETAILED DESCRIPTION

Figure 1:
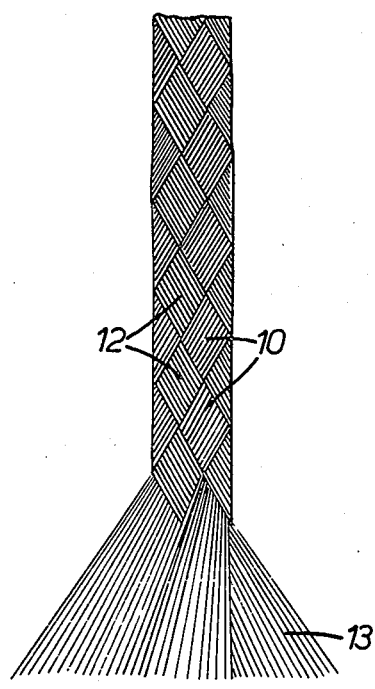
FIG. 1 is a detailed elevational view of one end of a braided wick of the prior art.

Referring first to FIG. 1, the prior braided wick comprises groups 10, 12 of parallel contiguous copper wires braided together into tubular structure, which is then flattened. The end 13 of the wick is shown with the wires fanned out (as mentioned above) to improve the sizes of the interstices ready for a solder-removing exercise.

Figure 2:
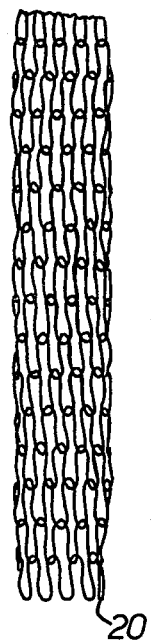
FIG. 2 is a detailed elevational view of a knitted wick according to the present invention.

Referring now to FIG. 2, the knitted wick of the present invention includes a strand 20 of copper formed by a continuous helically-forming knitting machine into a tubular open-mesh structure, subsequently flattened. Although this wick is shown formed with a strand into loops by knitting, it might instead be formed by crochetting or alternatively an open-mesh structure might be formed by weaving or indeed by braiding, providing the adjacent strands will not be contiguous and will instead provide open spaces for absorbing the molten solder. After cleaning, the strand 20 is coated with flux to complete the wick. As mentioned above, the copper strand may be coated (with copper or with tin or an alloy of lower melting point such as a tin-lead alloy) prior to flux coating, and indeed the strand may comprise a low-cost metal or even a non-metallic filament which is subsequently coated with one of the above metals prior to flux coating. Instead of the elongate form shown, the wick may be formed in a pad-shape.

In the knitted construction such as shown in FIG. 2, the diameter of the strand may be in the range 0.1 mm to 0.25 mm. With a diameter smaller than 0.1 mm, the knitting process may be too slow and risk strand breaks, whilst above 0.25 mm the mechanical wear on the knitting machine may be too great. The range of diameters may however vary depending on the type of knitting machine. The knitting machine in any event produces a tubular construction of a diameter, for example, approximately in the range 2 mm to 25 mm or more, which tube is then flattened between rollers. The stitch or mesh size is determined by the selected diameter and by the number of needles of the machine disposed around the circumference, thus 2, 3, 4, 6, 8 or 12 or more needles may be incorporated and this will be the number of stitches per circumference. The greater the number of needles for a given diameter, the greater the number of stitches per unit length and the smaller the mesh size. In the example shown in FIG. 2, the strand is a copper strand of 0.1 mm diameter and the production rate was 130 meters per hour.

The knitting can be carried out with all types of yarn, whether from cotton, wool, silk, nylon, acrylic, plastics or metal. If metal, it should be easy to bend such as copper. Knitting with metal is virtually identical to knitting of textile or like yarns, with appropriate selection of operating parameters because the metal is likely to lead to much higher wear on the machine. With non-metallic yarns the knitted wick will of course require subsequent metallisation.

What is claimed is:

1. A solder removing device, comprising
   (a) an open-mesh structure including at least one strand and being formed by knitting, weaving, stranding, braiding or crochetting,
   (b) adjacent sections of said strand being in non-contiguous relation thereby defining open spaces for absorbing molten solder,
   (c) at least the surface portion of said strand being metallic and receptive to solder flux,
   (d) said surface portion being coated with solder flux to render it more capable of wetting with molten solder.

2. A solder removing device as claimed in claim 1, wherein said structure has an elongate, flattened tubular configuration.

3. A solder removing device as claimed in claim 1, wherein said structure has a pad-shaped configuration.

4. A solder removing device as claimed in claim 1, and further wherein the strand is copper-coated after being formed into said open-mesh structure and prior to receiving said flux.

5. A method for removing solder from an object, which comprises the steps of:
   (a) heating the solder to a molten condition; and
   (b) engaging the molten solder with an open-mesh structure including at least one strand, said structure being formed by knitting, weaving, stranding, braiding or crochetting, adjacent sections of said strand in said open-mesh structure being arranged in noncontiguous relation thereby defining open spaces for absorbing molten solder.

6. A solder removing device, comprising an open-mesh structure including at least one strand and being formed by knitting, weaving, stranding, braiding or crochetting, said strand comprising a non-metallic filament, said strand being copper-coated after being formed into said open-mesh structure, said copper-coated open-mesh structure being coated with solder flux to render it more capable of wetting with molten solder.

7. A solder removing device comprising an open-mesh structure including at least one strand and being formed by knitting, weaving, stranding, braiding or crochetting, said strand being alloy-coated after being formed into said open-mesh structure, said alloy-coated open-mesh structure coated with solder flux to render it more capable of wetting with molten solder.

* * * * *